United States Patent Office 3,406,609
Patented Oct. 22, 1968

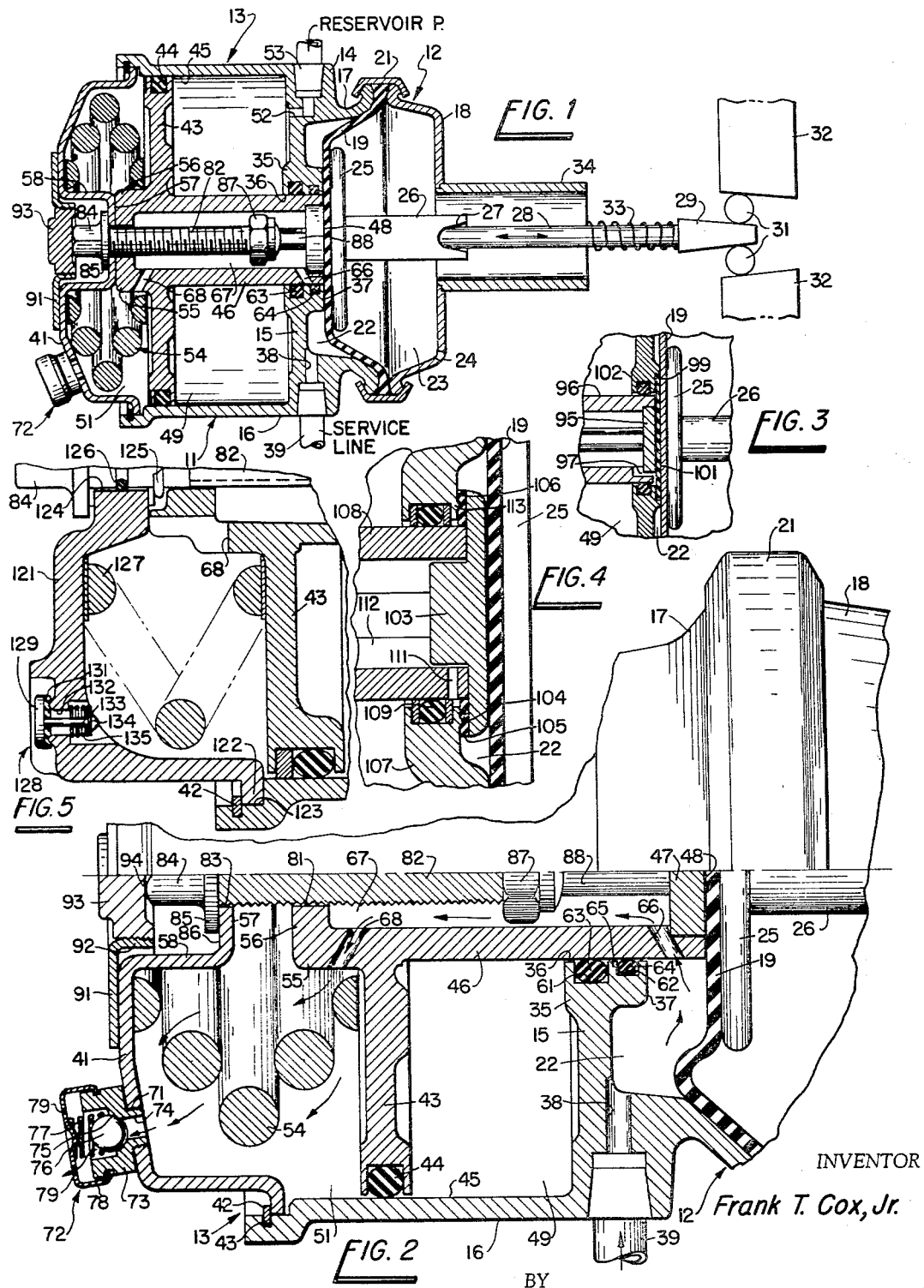

3,406,609
BRAKE ACTUATOR
Frank T. Cox, Jr., Ashtabula, Ohio, assignor to Rockwell-Standard Corporation, Pittsburgh, Pa., a corporation of Delaware
Filed July 8, 1966, Ser. No. 563,859
13 Claims. (Cl. 92—63)

ABSTRACT OF THE DISCLOSURE

A combination service and auxiliary brake operator comprises fluid pressure service and auxiliary motors in tandem with a piston in the auxiliary motor normally held in position to compress a spring in a spring chamber when the fluid pressure in the vehicle system is above a predetermined value, and the spring chamber is connected to the fluid pressure chamber of the service motor when the piston is displaced in brake operating direction, the spring chamber having a one-way check valve for exhaust of fluid from the spring chamber when the piston is displaced in the direction to compress the spring. This eliminates entry of dirt, moisture and undesired fluid into the auxiliary motor while providing adequate venting of the spring chamber.

---

This invention relates to fluid pressure brake systems for roadway vehicles and is particularly concerned with improvements in emergency and like auxiliary actuators as for applying the service brakes when the system pressure fails or falls to a dangerously low level.

In its preferred embodiment the invention will be described as incorporated in a combination service and emergency actuator assembly of the type disclosed in Williams Patent No. 3,136,227 wherein a service diaphragm in a service chamber is adapted for normal operation of the vehicle service brakes as by a brake pedal controlled valve admitting fluid pressure from the system reservoir to one side of the service diaphragm, and an emergency piston or diaphragm is disposed in tandem within an emergency chamber and exposed at one side to the system fluid pressure to hold a powerful emergency spring compresser within the emergency chamber independently of normal service operation. Should the system pressure fail or drop too low, the emergency spring expands and acts through a mechanical force transmitting connection with the service diaphragm to actuate the service brakes automatically.

Fluid pressure motors of the type incorporated in emergency chambers of this type require venting of the emergency chamber containing the spring, to prevent a vacuum from being formed in the emergency chamber as a spring expands and to expel excess air from the emergency chamber as the spring is compressed.

Prior to the invention this venting was mainly provided by a plurality of small open apertures in the emergency chamber wall, but this arrangement permitted moisture and dust to enter and ice to form over the apertures with the result that operation was hampered, the spring and the internal surfaces rusted and dirt accumulated, and this usually produced early failure of the motor even when it received periodic servicing and cleaning. In some motors of this type, filters were provided in these vent apertures to at least reduce the dirt intake, but these filters had to be fairly coarse so as not to interfere with air flow and they did not satisfactorily keep out dust or moisture. Moreover, filters of any type soon become plugged with accumulated dirt even in normal operation, unless constantly very regularly serviced and/or replaced, an expensive maintenance procedure. Under adverse road conditions and during freezing weather, these filters become clogged quickly and adverse motor operation is common regardless of regular maintenance.

The invention overcomes the foregoing difficulties by providing for adequate venting and breathing of the emergency chamber while blocking entry of all dirt, dust and moisture, without interfering with normal actuator operation, and such is therefore the major object of the invention.

In its preferred embodiment the invention provides a novel simple arrangement for venting and allowing the emergency chamber of a fluid motor of a brake actuator assembly to breath without drawing in contaminated air from the atmosphere. This is accomplished by providing unrestricted flow of fluid under pressure such as air into the motor chamber from within the actuator assembly and by the provision of an unidirectional check valve which allows the fluid to be expelled from the emergency motor chamber but effectively prevents ambient contaminated air from entering that chamber, and such is another object of the invention.

The invention may be applied to other motors than the emergency actuator motor of the present preferred embodiment.

A further object of the invention resides in providing a fluid pressure motor having a one-way check valve in the chamber wall to allow out-breathing of the motor but prevent in-breathing of a contaminated outside air.

Another object of the invention is to provide suitable passages in an actuator assembly fluid motor of a roadway vehicle brake system for allowing air from within the system under certain conditions of operation to pass freely from a pressure chamber such as a fluid pressure chamber of the service motor into a non-pressure chamber such as the spring containing section of the emergency motor during actuation to prevent the forming of a vacuum in the non-pressure chamber and to allow the fluid motor to breath without taking in any outside, contaminated air.

Another object of the invention is to provide a novel combination service and emergency actuator wherein service and emergency motors are mounted in tandem with the service and emergency fluid pressure chambers disposed on opposite sides of an internal wall through which projects the stem of a slidable emergency piston and wherein a passage is automatically provided through the emergency piston permitting air to flow from the service fluid pressure chamber to an emergency spring containing chamber of the emergency motor at the opposite side of the piston from the emergency fluid pressure chamber when the emergency piston is displaced by the spring toward the service motor. Attendant to this object the invention provides a one-way check valve in the wall of said spring containing section of the emergency motor to permit air to be expelled therefrom when the spring is being compressed by the piston.

Further objects and novel features of the present invention will become more readily apparent and easily understood by the following detailed description in connection with the appended drawings in which:

FIGURE 1 is a cross-section view showing details of a combination service and emergency actuator for a fluid pressure brake system in a roadway vehicle according to a preferred embodiment of the invention;

FIGURE 2 is an enlarged half cross-section mainly through the emergency chamber section of FIGURE 1 illustrating the breathing arrangements of the invention;

FIGURE 3 is a fragmentary view in section that illustrates a further embodiment of the invention using an alternate seal arrangement between the service chamber and emergency chamber of the actuator in FIGURE 1;

FIGURE 4 is a fragmentary view in section showing still another embodiment of a seal arrangement between the chambers; and FIGURE 5 is a fragmentary view showing another emergency motor end member having a different type of breather valve.

Referring to FIGURES 1 and 2, a combined service and emergency and/or parking brake actuator 11 comprises a service actuator motor 12 and an auxiliary actuator motor 13 arranged in tandem.

The actuator comprises an integral usually cast metal rigid housing 14 having an internal transverse wall 15. At one side of wall 15 extends the cylindrical wall 16 of the auxiliary motor. At the other side of wall 15 extends the cup shaped wall 17 of the service chamber.

The service motor comprises an opposed cup shaped member 18 usually of sheet metal that is peripherally secured to wall 17, and a flexible gas impervious diaphragm 19 within the motor has its periphery clamped between the mating edges of wall 17 and member 18 by an annular clamp indicated at 21. Diaphragm 19 separates the service motor into a service air pressure control chamber 22 adjacent wall 15, and a chamber 23 vented to atmosphere at 24.

Within chamber 23 diaphragm 19 has one side secured to a large area abutment 25 on a plunger 26 having an end socket 27 wherein is seated the rounded end of a wedge rod 28 for limited rocking and relative rotation. A wedge 29 on rod 28 carries anti-friction force transmitting rollers 31 disposed between opposite sides of the wedge and opposed brake shoe connected plungers 32 that are suitably connected to the opposite ends of pivoted brake shoes in the manner shown in said Williams patent or Patent No. 3,037,584.

Suitable return spring means within the brake assembly, diagrammatically indicated at 33 for simplicity of disclosure, urges the wedge rod and diaphragm 19 to the left in FIGURE 1 which shows the arrangement of parts that exists when the brake shoes are disengaged from the brake drum.

The entire actuator 11 is preferably suitably mounted by the extension 34 on the brake mechanism mounting plate (not shown) carrying the brake shoes and usually fixed in the vehicle axle.

It will be observed that wall 15 is formed with a central hollow boss 35 which surrounds a cylindrical opening 36 and projects into the service motor to define a flat axial surface 37 surrounding opening 36 within chamber 22. In the brake disengaged position of FIGURE 1, it will be noted that in the limit position of diaphragm 19 to the left the diaphragm is forced against surface 37, but the projection of the boss within the service motor insures that the diaphragm is not forced into contact with the entire inner surface of wall 17, and so space is provided for entry of service air under pressure through aperture 38 and a fitting 39 connected to the compressed air reservoir of the vehicle (not shown).

The auxiliary motor 13 comprises a cup shaped preferably sheet metal end member 41 secured over the open end of cylindrical wall 16 as by a snap ring 42 seated in groove 43. Member 41 is imperforate except as will appear and the fit at ring 42 is substantially air tight.

A piston 43 is reciprocably mounted within cylinder 16, and its grooved periphery mounts a compressed resilient seal ring 44 in sliding engagement with cylindrical surface 45. Piston 43 has on one side a hollow cylindrical stem 46 that extends slidably into wall opening 36 and has its outer end closed as by a block 47. The flat end surface 48 of stem 46 is perpendicular to the axis of the piston and engages the service diaphragm 19 as will appear.

Piston 43 divides the auxiliary motor into a control air pressure chamber 49 adjacent wall 15 and a spring containing chamber 51. Chamber 49 is connected directly through a wall aperture 52 and fitting 53 to the air pressure reservoir of the vehicle so that full air pressure of the reservoir is provided in chamber 49. When full air pressure exists in chamber 49, piston 43 is forced to its left limit position shown in FIGURE 1, wherein it fully compresses a very strong spring 54 between it and end member 41.

As illustrated spring 54 is preferably of the barrel type having a larger central diameter than at its ends, which enables optimum compression within minimum axial space.

Hollow stem 46 continues through the piston to provide a short piston stem extension 55 within the spring chamber having a closed end 56 that in the assembly abuts against a flat axial face 57 on internal central hollow boss 58 of end member 41 which thus serves as a stop to limit movement of the piston in that direction. The location of this stop and the dimension of the parts are such that when piston 43 is in the limit position of FIGURE 1, which it occupies while the air in the reservoir is above a predetermined operating pressure, stem end face 48 is substantially flush with surrounding boss end face 37.

Boss opening 36 of the wall 15 contains two spaced annular grooves 61 and 62 in which are mounted resilient seal rings 63 and 64 such as synthetic rubber O-rings. Rings 63 and 64 are separated by an annular land 65, and are compressed radially in sliding sealing engagement with the periphery of piston stem 46. The end of piston stem 46 at wall 15 is formed with a port 66 that is always open at its inner end to the passage space 67 through the piston and stem. Port 66 is so located that when the piston is in the FIGURE 1 position, the outer end of port 66 lies axially between seal rings 63 and 64, preferably opposite land 65.

The extended piston stem at 55 is formed with a second port 68 that always connects passage space 67 with spring chamber 51.

End member 41 is provided with a threaded aperture 71 in which is mounted a check valve unit 72 comprising a body 73 mounted in aperture 71 and formed with an opening 74 at the outer end of which is an enlarged bore having a conical seat 75. A spherical valve element 76 is urged onto seat 75 by a spring 77 held compressed by a cap 78 secured to the body and having a series of openings 79.

The stem end wall 55 is apertured at 81 to freely slidably pass a threaded adjustment rod 82 that also extends rotatably through an aperture 83 in boss 58 to terminate in an enlarged wrench fitting head 84 disposed within boss 58. A flange 85 on head 84 is disposed in rotative sliding engagement with the flat inner surface 86 of boss 58. An octagonal or other suitably non-circular nut 87 is mounted on threaded rod 82 with its periphery non-rotatably but axially slidably seated in the similarly shaped wall 88 of space 67.

An annular sheet metal plate 91 is fixed as by welding around the open end of boss 58 and is formed with an integral internally threaded collar 92 projecting into the boss. A nut 93 in collar 92 closes the outer end of boss 58, and the inner end of the nut is suitably formed at 94 to seat on the rod head 84 to normally resist rotation of rod 82 about its axis.

In operation of the actuator shown in FIGURES 1 and 2, the parts are associated as in FIGURE 1 when the vehicle brakes are disengaged. At that time the piston 43 is held retracted by reservoir pressure to compress spring 54. The end stem 46 is flush with boss surface 37 and flexible diaphragm 19 is pressed against both surfaces 37 and 48 by the large area end 25 of the plunger. At this time port 66 is closed at its outer end since it is disposed at land 65 between the seals at 63 and 64. The check valve 72 is closed.

During normal vehicle operation air under pressure is introduced through line 39 into chamber 22 and, since no air can escape through boss 35, this results in displacement of diaphragm 19 to the right in FIGURE 1 to apply the brakes. When the operator releases the brake pedal to cut off supply of service air under pressure in line 39 and exhaust chamber 22 by suitable means (not shown) the diaphragm returns to FIGURE 1 position.

During the foregoing normal service brake operation there is no change in the position of the parts in auxiliary motor 13.

However, should the air pressure in the reservoir drop below a predetermined level, as where the compressor has failed or the tank is punctured, the holding pressure in control chamber 49 drops and spring 54 expands to drive piston 43 to the right in FIGURE 1. This action is illustrated at an intermediate phase in FIGURE 2, wherein the piston stem has displaced plunger 26 in the service brake applying direction.

The foregoing action of the service and auxiliary emergency brake motors is known and disclosed in United States Letters Patent No. 3,136,227 and FIGURE 2 illustrates the invention which takes effect after the front end of the piston stem has moved sufficiently to break the seal and dispose the port 66 in communication with chamber 22. This provides an air passage consisting of port 66, space 67 and port 68 placing chambers 22 and 51 in communication, and since chamber 22 is at atmospheric pressure or higher no vacuum will be formed in chamber 51 by piston displacement and only air from chamber 22 can enter chamber 51. Such air is clean and free from contamination since it is derived from the air pressure system which is suitably filtered.

When the pressure in the reservoir is restored and applied to chamber 51 through line 53, piston 43 is driven to the left in FIGURE 1 to the fully retracted position. During this movement the excess air in chamber 51 is discharged through the check valve 72, so that no contaminated air or moisture enters chamber 51.

The same benefit is obtained when chamber 51 is not strictly an emergency chamber, but wherein the pressure in chamber 51 may be modulated as by a control valve in line 53 as for parking or in a two line control system such as disclosed in Ser. No. 545,468 filed Apr. 26, 1966 for Vehicle Brake Actuator.

Also, while the foregoing is based on the specific disclosure of a wedge type brake actuator, the invention may be applied to an actuator assembly connected to a cam operated brake mechanism such as disclosed in United States Letters Patent No. 3,095,950.

FIGURE 3 illustrates another embodiment wherein the closed end 95 of hollow piston stem 96 is formed with a port 97 that opens axially toward chamber 22. Boss 98 of the intermediate wall is here formed with an annular groove 99 surrounding the opening through which the piston stem extends, and a flat disk 101 of resilient material is secured on the end of the piston stem with its periphery extending into groove 99 so as to normally seal off communication between port 97 and chamber 22. Internally the opening in the wall is grooved to mount air O-ring 102 slidingly sealingly extending around the periphery of piston stem 96.

During normal service brake operation there is no communication between chamber 22 and the interior of the piston stem because disk 101 is sealingly held to close the end of port 97, either by the retracted plunger 26 or by the air under pressure in chamber 22.

When however, the piston stem 96 is displaced to the right, as during emergency action the end of port 97 is placed in communication with chamber 22 to equalize the pressure in the spring chamber as in the FIGURE 2 embodiment.

FIGURE 4 shows still another mode of sealing the inner end of the hollow piston stem. Here the end wall 103 of the piston stem is a button having an annular face 104 surrounding the stem and bearing a resilient seal ring 105 adapted to seat on the surface 106 surrounding the opening in the actuator wall 107 through which the piston stem 108 extends. A suitable annular O-ring seal assembly 109 in wall 107 slidingly sealingly surrounds the piston stem.

A port 111 is formed in the wall of stem 108 always open to passage space 112 within the piston, and during normal service brake operation this port is closed to communication between chamber 22 and space 112 by the action of seal ring 105. As shown in FIGURE 4 an annular rib 113 may be formed on face 106 to increase the sealing action by imbedding into the resilient ring.

When the piston is displaced to the right in FIGURE 4, as in emergency operation, seal ring 105 leaves face 106 and port 111 has its outer end located in communication with chamber 22 to equalize the pressure in the spring chamber as in the other embodiments.

Once the pressure in emergency control chamber 49 has dropped to allow expanded spring 54 to apply the service brakes, they can be released by removing nut 93 and applying a wrench to head 84 to rotate rod 82. Since nut 87 is non-rotatable within the piston stem, rotation of rod 83 causes movement of nut 87 to the left in FIGURE 1 along guide 88 to abut piston 43 and then displace the piston to the left into spring compressing condition, which allows the usual return spring of the vehicle brakes to disengage the service brakes. When holding air pressure is restored in the chamber 49, rod 82 is rotated to restore nut 87 to the FIGURE 1 position where it may serve as a limit stop to piston displacement during emergency actuation.

The foregoing operation of retracting the piston is accomplished by an axially compact arrangement that does not increase the space requirements for the actuator assembly.

FIGURE 5 shows an embodiment wherein the removable cup-shaped emergency motor end member 121 is a cast metal part instead of a sheet metal stamping as shown at 41. The peripheral rim 122 of member 121 is held in housing shoulder 123 by snap ring 42.

Member 121 is centrally formed with an opening 124 wherein the shank of adjustment rod 82 is rotatably mounted and held against axial displacement between head 84 and a snap ring 125 on the rod. A resilient O-ring seal 126 is provided on the rod in opening 124. A spring 127 is compressed between member 121 and the piston 43.

This embodiment also uses a different type of unidirectional breather valve 128 for the emergency chamber. Valve 128 is a poppet type valve having a head 129 provided with resilient surface 131 seated over an opening 132 in member 121. A valve stem 133 extends from head 129 through the opening to mount a washer or like stop 134, and a biasing spring 135 reacts between the member 121 and washer 134 to seat head 129 to normally close opening 132. The breathing operation of valve 128 is essentially the same as that of valve 72, in that it presents intake of ambient air, and permits exhaust of air from the spring chamber when the spring is being compressed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A combination service and auxiliary brake actuator assembly comprising means defining a fluid pressure responsive service motor having a fluid pressure receiving chamber and being operably connected for actuating vehicle service brakes, means defining a fluid pressure responsive auxiliary motor having a spring chamber, means automatically operatively conditioning and connecting said auxiliary motor to actuate said service brakes under predetermined auxiliary operation conditions, and means for maintaining said spring chamber at least at ambient atmospheric pressure during both normal service and auxiliary actuations of said assembly while preventing the direct introduction of ambient air into said spring chamber comprising means for passing fluid from said service motor chamber into said spring chamber during actuation of said service brakes by the auxiliary motor.

2. A combination service and auxiliary brake actuator assembly comprsing means defining a fluid pressure responsive service motor operably connected for actuating vehicle service brakes, means defining a fluid pressure responsive auxiliary motor having a spring chamber, means automatically operatively conditioning and connecting said auxiliary motor to actuate said service brakes under predetermined auxiliary operation conditions, and means for maintaining said spring chamber at least at ambient atmospheric pressure during both normal service and auxiliary actuations of said assembly while preventing the direct introduction of ambient air into said spring chamber, said auxiliary motor comprising a movable fluid pressure responsive element separating the interior of said auxiliary motor into said spring chamber and a control fluid pressure chamber, means for passing fluid from the service motor through said element into said spring chamber during actuation of said service brakes by the auxiliary motor, and unidirectional check valve means for said spring chamber permitting exhaust of fluid from said spring chamber but preventing direct introduction of surrounding air into said spring chamber during all operational conditions.

3. In the actuator assembly defined in claim 2, said element being displaced to a normally inoperative position while a predetermined fluid pressure is maintained in said control chamber, and said means for passing fluid through said element comprising means defining a passage through said element having one end in open communication with said spring chamber, and means in the assembly for closing the other end of said passage when said element is in said inoperative position.

4. In the actuator assembly defined in claim 3, said service motor having an operating chamber adapted to receive fluid under pressure for normal service bake operation, and said other end of said passage being opened to said operating chamber upon displacement of said element for auxiliary actuation of said service brakes.

5. In the actuator assembly defined in claim 2, said element being a piston that is displaced by pressure in said control chamber to compress spring means in said spring chamber, and said piston having a hollow stem provided with ports at opposite sides of said piston to define said passage through said element.

6. In the actuator assembly defined in claim 5, said closing means comprising means for blocking the port at the side of said stem adjacent the service motor while said piston is maintained in spring compressing position by predetermined fluid pressure in said control chamber.

7. In a combination service and auxiliary brake actuator assembly for a vehicle, means defining a housing enclosing service and auxiliary air pressure motors disposed in tandem, said housing having an internal wall on opposite sides of which are disposed control air pressure chambers for the respective motors, a fluid pressure responsive element in the service motor having one side exposed to the service motor control air pressure chamber and being operably connected to actuate the vehicle service brakes, a piston in said auxiliary motor exposed in opposite sides to said auxiliary motor control air pressure chamber and a spring chamber respectively, said piston having a hollow stem slidably projecting through an aperture in said wall to engage said element, spring means in the spring chamber adapted to be held in energized compressed condition by the piston when there is a predetermined air pressure in said auxiliary air pressure control chamber representing sufficient air pressure in a vehicle system providing a source of air pressure for said actuator assembly, means defining a fluid passage through said piston stem open to said spring chamber, means closing said passage to fluid flow therethrough when the piston is in said energized condition, said passage being opened to provide communication between said service air pressure control chamber and said spring chamber when said piston is displaced by said spring means in the direction of said element, and a unidirectional check valve for said spring chamber permitting exhaust of air from said spring chamber, said spring chamber being otherwise closed to ambient air.

8. In the actuator assembly defined in claim 7, said fluid passage through said hollow piston stem having a port adjacent said wall aperture and said port being closed by sealing means adjacent said aperture when said piston is in said spring energized position.

9. In the actuator assembly defined in claim 8, said sealing means comprising resilient means in said wall aperture for sliding engaging said stem at said port.

10. In the actuator assembly defined in claim 9, said port being radial and said resilient means being O-rings surrounding said piston stem on opposite sides of said port.

11. In the actuator assembly defined in claim 8, said sealing means comprising a resilient member axially compressed against said wall around said aperture.

12. In the actuator assembly defined in claim 7, annular resilient means in said wall aperture slidingly sealing engaging said stem, and a resilient valving member mounted on said stem adapted to be axially sealingly compressed against said wall when the piston is in said spring energized position, said hollow stem having a port adjacent said aperture having an outer end disposed between the seals provided by said resilient means and valving member when the piston is in said spring energizing position but which is open to said service air pressure control chamber when said piston is displaced toward said element.

13. In the actuator assembly defined in claim 12, said valving member being a body of synthetic rubber mounted on said stem and adapted to engage said wall in an annular area around said aperture in said service air pressure control chamber.

References Cited

UNITED STATES PATENTS

| 2,932,280 | 4/1960 | Vielmo | 91—442 X |
| 3,020,094 | 2/1962 | Murty et al. | |
| 3,302,530 | 2/1967 | Dobrikin et al. | 91—440 |

FOREIGN PATENTS 944,223   12/1963   Great Britain.

EDGAR W. GEOGHEGAN, *Primary Examiner.*

I. C. COHEN, *Assistant Examiner.*